(12) United States Patent
Lee et al.

(10) Patent No.: US 12,476,323 B2
(45) Date of Patent: Nov. 18, 2025

(54) BATTERY PACK HAVING STRUCTURE WITH INCREASED MOVEMENT AND EASE OF ASSEMBLY AND STRUCTURE WITH IMPROVED SAFETY, AND ESS COMPRISING SAME

(71) Applicant: LG ENERGY SOLUTION, LTD., Seoul (KR)

(72) Inventors: Eung-Gyu Lee, Daejeon (KR); Jae-Ki Lee, Daejeon (KR); Jae-Bum Lim, Daejeon (KR); Yeo-Joo Choi, Daejeon (KR); Bum-Hyun Lee, Daejeon (KR); En-Bin Jo, Daejeon (KR); Seok-Hyun Hong, Daejeon (KR)

(73) Assignees: LG ENERGY SOLUTION, LTD., Seoul (KR); OMRON CORPORATION, Kyoto (JP)

( * ) Notice: Subject to any disclaimer, the term of this patent is extended or adjusted under 35 U.S.C. 154(b) by 645 days.

(21) Appl. No.: 17/796,775

(22) PCT Filed: Mar. 11, 2021

(86) PCT No.: PCT/KR2021/003047
§ 371 (c)(1),
(2) Date: Aug. 1, 2022

(87) PCT Pub. No.: WO2021/187806
PCT Pub. Date: Sep. 23, 2021

(65) Prior Publication Data
US 2023/0083113 A1    Mar. 16, 2023

(30) Foreign Application Priority Data
Mar. 19, 2020 (KR) .................. 10-2020-0034081

(51) Int. Cl.
*H01M 50/367* (2021.01)
*H01M 10/42* (2006.01)
(Continued)

(52) U.S. Cl.
CPC ....... *H01M 50/367* (2021.01); *H01M 10/425* (2013.01); *H01M 50/204* (2021.01);
(Continued)

(58) Field of Classification Search
None
See application file for complete search history.

(56) References Cited

U.S. PATENT DOCUMENTS 9,472,797 B2    10/2016  Han et al.
2009/0220851 A1  9/2009  Nakazawa et al.
(Continued)

FOREIGN PATENT DOCUMENTS

CN    102770982 A    11/2012
CN    106374070 A    2/2017
(Continued)

OTHER PUBLICATIONS

Machine translation of JP-2012-221844-A, published on Nov. 12, 2012.
(Continued)

*Primary Examiner* — Alix E Eggerding
(74) *Attorney, Agent, or Firm* — Birch, Stewart, Kolasch & Birch, LLP

(57) ABSTRACT

A battery pack includes a pair of battery modules having a plurality of first partition walls formed to extend downward from a lower surface thereof, a supporting plate having a plurality of second partition walls formed to extend upward from an upper surface thereof and a gas discharge hole formed at a longitudinal center thereof, the supporting plate being coupled to a bottom of the pair of battery modules
(Continued)

such that plurality of first partition walls and the plurality of second partition walls are adjacent and overlap each other in one-to-one pairs and a BMS assembly coupled to an upper portion of the pair of battery modules in a plug-in type.

14 Claims, 11 Drawing Sheets

(51) Int. Cl.
 *H01M 50/204* (2021.01)
 *H01M 50/271* (2021.01)
 *H01M 50/291* (2021.01)
 *H01M 50/583* (2021.01)
(52) U.S. Cl.
 CPC ....... *H01M 50/271* (2021.01); *H01M 50/291* (2021.01); *H01M 50/583* (2021.01); *H01M 2010/4271* (2013.01); *H01M 2200/103* (2013.01)

(56) References Cited

U.S. PATENT DOCUMENTS

| | | | |
|---|---|---|---|
| 2013/0040174 | A1 | 2/2013 | Takasaki et al. |
| 2016/0222631 | A1 | 8/2016 | Kohno et al. |
| 2017/0365887 | A1 | 12/2017 | Kwon et al. |
| 2018/0108892 | A1 | 4/2018 | Kim et al. |
| 2018/0175464 | A1 | 6/2018 | Kim et al. |
| 2018/0358593 | A1 | 12/2018 | Seo et al. |
| 2019/0036091 | A1 | 1/2019 | Lee et al. |
| 2019/0097192 | A1 | 3/2019 | Kim et al. |
| 2020/0035979 | A1 | 1/2020 | Yamamoto et al. |
| 2021/0313650 | A1 | 10/2021 | Gondoh |
| 2024/0162506 | A1* | 5/2024 | Lee .................... H01M 50/514 |

FOREIGN PATENT DOCUMENTS

| | | |
|---|---|---|
| CN | 209607808 U | 11/2019 |
| CN | 210040454 U | 2/2020 |
| JP | 2007-027011 A | 2/2007 |
| JP | 2012-221844 A | 11/2012 |
| JP | 5088688 B2 | 12/2012 |
| JP | 2013-181735 A | 8/2013 |
| JP | 2015-118811 A | 6/2015 |
| JP | 2015-141887 A | 8/2015 |
| JP | 2018-195745 A | 12/2018 |
| KR | 10-2017-0037125 A | 4/2017 |
| KR | 10-2017-0095070 A1 | 8/2017 |
| KR | 10-2017-0142442 A | 12/2017 |
| KR | 10-2018-0006150 A | 1/2018 |
| KR | 10-2018-0113801 A | 10/2018 |
| KR | 10-2030726 B1 | 10/2019 |
| KR | 10-2033101 B1 | 10/2019 |
| WO | WO 2016-199558 A1 | 12/2016 |
| WO | WO 2020/039722 A1 | 2/2020 |

OTHER PUBLICATIONS

International Search Report (PCT/ISA/210) issued in PCT/KR2021/003047, dated Jun. 17, 2021.
Extended European Search Report for European Application No. 21772158.8, dated Jan. 2, 2024.

* cited by examiner

BATTERY PACK HAVING STRUCTURE WITH INCREASED MOVEMENT AND EASE OF ASSEMBLY AND STRUCTURE WITH IMPROVED SAFETY, AND ESS COMPRISING SAME

TECHNICAL FIELD

The present disclosure relates to a battery pack having a structure with improved convenience for carrying and assembling and improved safety, and an ESS including the battery pack, and more particularly, to a battery pack having a structure for fastening a plurality of battery modules by using a module fastening plate and a BMS assembly and a structure for preventing a flame generated at a battery cell provided therein from being leaked out of the battery pack, and an ESS including the battery pack.

The present application claims priority to Korean Patent Application No. 10-2020-0034081 filed on Mar. 19, 2020 in the Republic of Korea, the disclosures of which are incorporated herein by reference.

BACKGROUND ART

A battery pack used as an energy storage system (ESS) is a kind of energy storage system configured to remove the risk caused by external physical factors during use and to function properly in consideration of the installation environment and use conditions. The battery pack used as an energy storage system may have a form in which a plurality of battery modules and a BMS assembly electrically connected to the battery modules are coupled.

Among various kinds of battery packs used as an energy storage system, in particular, a battery pack for home use is often necessary to move through narrow stairs and/or passages. The battery pack used as an energy storage system has a relatively large volume and a relatively heavy weight in many cases, so the battery pack should be made in consideration of the convenience for carrying and installation. In addition, since the battery pack used as an energy storage system includes a plurality of battery cells to ensure sufficient capacity and output, the battery pack needs to be designed to secure user safety in case an abnormal situation occurs during use.

DISCLOSURE

Technical Problem

The present disclosure is designed to solve the problems of the related art, and therefore the present disclosure is directed to providing a battery pack having a structure with improved convenience for carrying and installation and improved safety during use.

However, the technical problem to be solved by the present disclosure is not limited to the above, and other objects not mentioned herein will be understood from the following description by those skilled in the art.

Technical Solution

In one aspect of the present disclosure, there is provided a battery pack, comprising: a pair of battery modules, each battery module of the pair of battery modules having a lower surface and a plurality of first partition walls extending downward from the lower surface; a supporting plate having a plurality of second partition walls extending upward from an upper surface and a gas discharge hole formed at a longitudinal center, the supporting plate being coupled to a bottom of the pair of battery modules such that the plurality of first partition walls and the plurality of second partition walls are adjacent and overlap each other in one-to-one pairs; and a Battery Management System (BMS) assembly coupled to an upper portion of the pair of battery modules.

The plurality of first partition walls may be spaced apart from the supporting plate, and the plurality of second partition walls may be spaced apart from the lower surface of the pair of battery modules.

The plurality of first partition walls may be spaced apart from the supporting plate, and at least a part of the plurality of second partition walls may have a partition wall hole formed in a region contacting the lower surface of the pair of battery modules and faces the first partition wall.

Each battery module of the pair of battery modules may include a cell stack having a plurality of battery cells; a module housing configured to accommodate the cell stack; a lower cover configured to cover a bottom opening of the module housing; and an upper cover assembly configured to cover a top opening of the module housing.

A gas channel may be formed between the cell stack and the module housing.

The lower cover may have lower cover holes formed at longitudinal sides thereof to communicate with the gas channel.

A mesh filter may be inserted into at least one of the gas discharge hole and the lower cover holes.

The upper cover assembly may include an upper cover configured to cover the top opening of the module housing, the upper cover having a connector formed at one longitudinal side thereof and an upper cover groove formed at a center thereof to be concave downward; a fuse fixed in the upper cover groove and electrically connected to the plurality of battery cells; a fuse cover configured to cover the fuse inside the upper cover groove; and a cover plate configured to cover a top of the upper cover groove and coupled to the upper cover.

The cover plate may have at least one pair of cover plate holes and be spaced apart from the fuse cover so that a first grip groove is formed between the cover plate and the fuse cover.

The BMS assembly may include a BMS body coupled to the pair of battery modules; and a BMS cover coupled to an upper portion of the BMS body.

The battery pack may have second grip grooves formed between a longitudinal side of the BMS cover and a longitudinal side of the BMS body.

The BMS body may include a guide protrusion formed at a lower surface thereof and inserted into the first grip groove through the cover plate to guide coupling between the BMS assembly and the pair of battery modules.

The battery pack may further comprise a gasket interposed between the guide protrusion and an inner surface of the at least one pair of cover plate holes.

The supporting plate may be fixed to the ground.

Meanwhile, in another aspect of the present disclosure, there is also provided an ESS, comprising at least one battery pack according to an embodiment of the present disclosure.

Advantageous Effects

According to an embodiment of the present disclosure, it is possible to provide a battery pack having a structure with improved convenience for carrying and installation and improved safety during use.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

First, a schematic structure of a battery pack 1 according to an embodiment of the present disclosure and a coupling relationship between respective components thereof will be described with reference to FIGS. 1 and 2.

Figure 1:
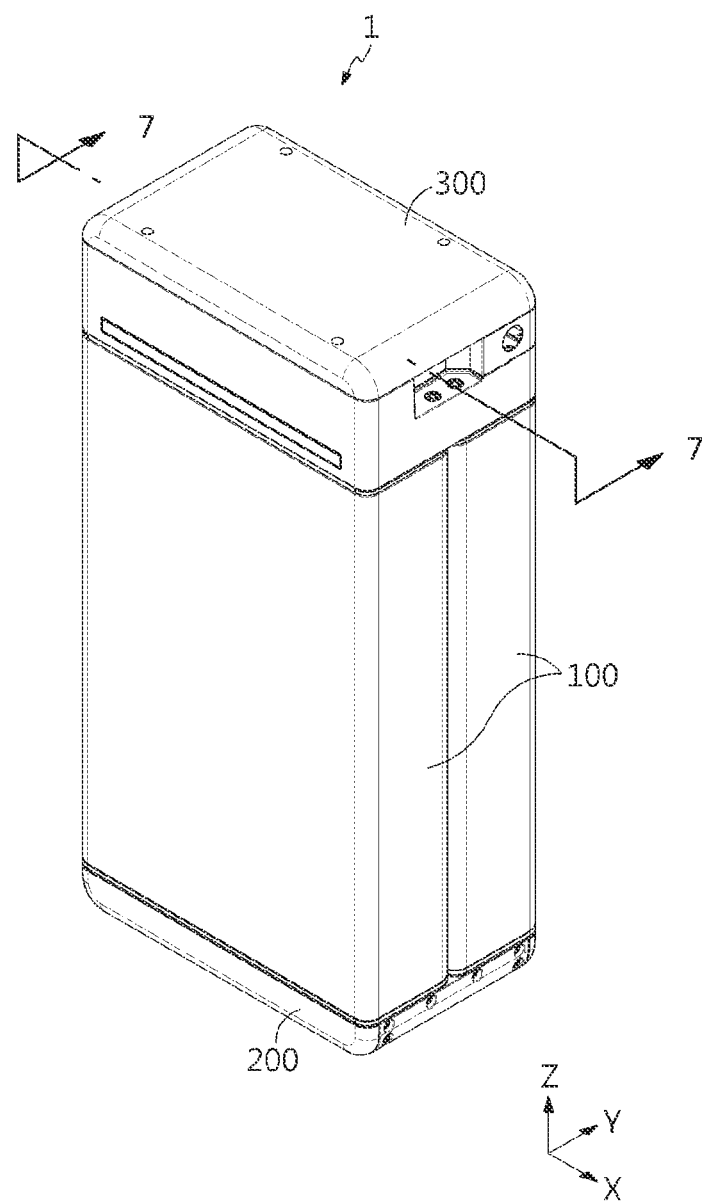
FIG. 1 is a perspective view of a battery pack according to an embodiment of the present disclosure in an assembled state.
Figure 2:
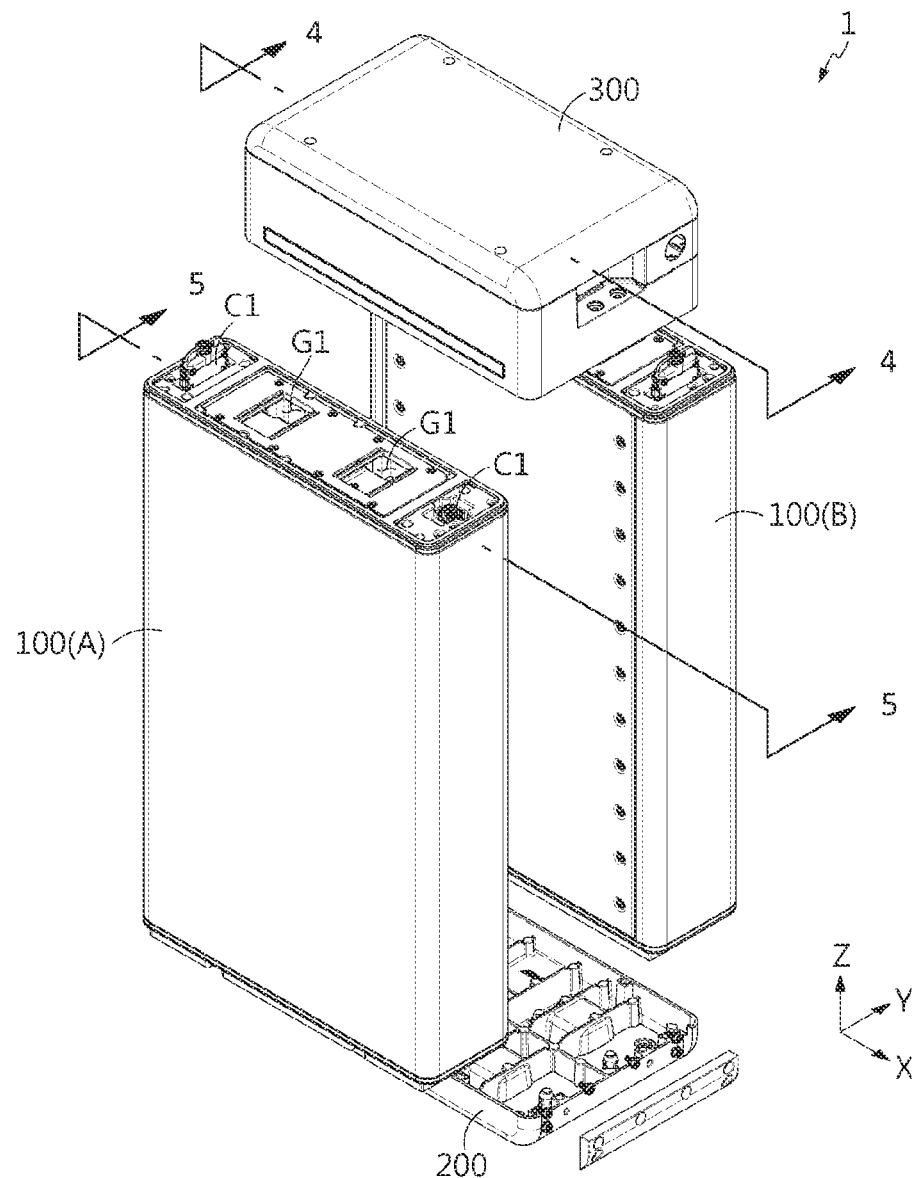
FIG. 2 is an exploded perspective view showing the battery pack of FIG. 1.

Referring to FIGS. 1 and 2, the battery pack 1 according to an embodiment of the present disclosure includes a plurality of battery modules 100, a supporting plate 200, and a BMS assembly 300. The battery pack 1 may be, for example, an energy storage system (ESS) battery pack for energy storage.

A bottom of the battery module 100 is inserted/fixed to the supporting plate 200, and the BMS assembly 300 is coupled to a top of the battery module 100.

The supporting plate 200 may be fixed to the ground, thereby functioning as a bracket for fixing the plurality of battery modules 100. Here, the ground means a floor surface of the place where the battery pack 1 is used for energy storage. That is, the ground may refer to a floor surface of a container or a floor surface of an indoor space of a building.

The BMS assembly 300 includes at least one BMS (Battery Management System), and the BMS assembly 300 may be coupled to the top of the plurality of battery modules 100 in a plug-in type to mechanically fasten the plurality of battery modules 100 to each other and control charging and discharging for the plurality of battery modules 100. In addition, the BMS assembly 300 may enable electrical connection among the plurality of battery modules 100.

The battery module 100 and the BMS assembly 300 may be coupled by combining a first connector C1 provided at an upper surface of the battery module 100 and a second connector C2 (see FIG. 7) provided at a lower surface of the BMS assembly 300. In addition, a plurality of first grip grooves G1 may be formed in the upper surface of the battery module 100, and a plurality of guide protrusions 311 (see FIG. 8) provided in a shape and number corresponding to the plurality of first grip grooves G1 and inserted into the first grip grooves G1 may be formed at the lower surface of the BMS assembly 300 to guide the coupling between the battery module 100 and the BMS assembly 300.

Next, a detailed structure of the battery module 100 will be described with reference to FIGS. 3 and 4.

Figure 3:
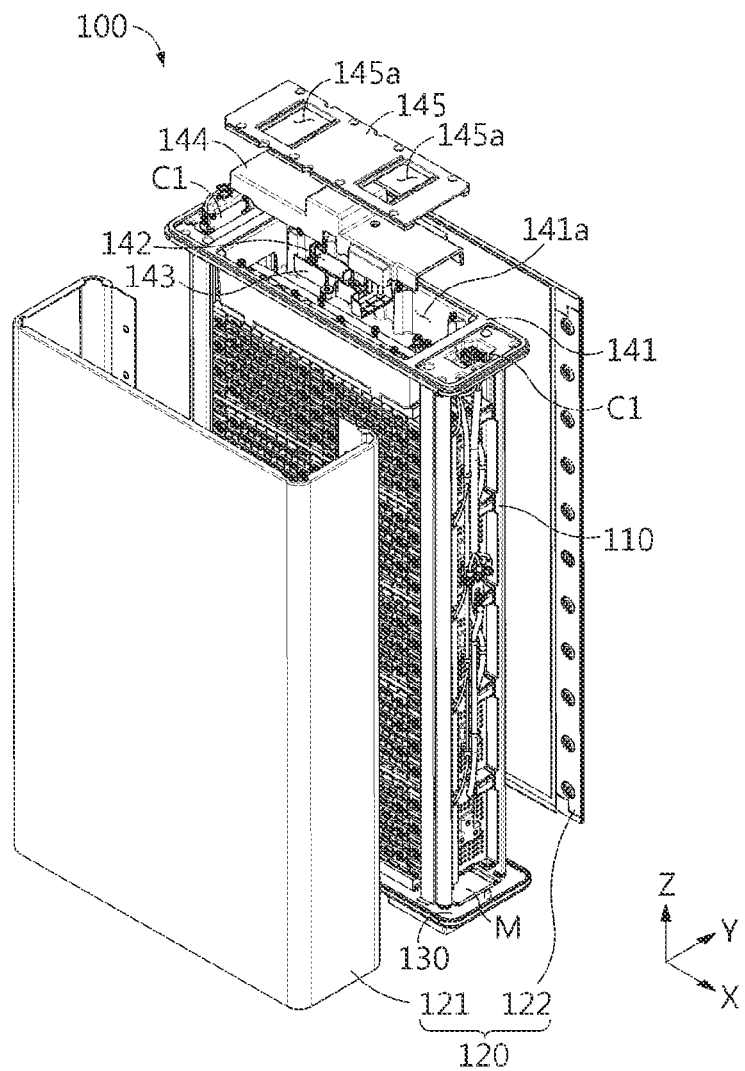
FIG. 3 is an exploded perspective view showing a battery module applied to the present disclosure.
Figure 4:
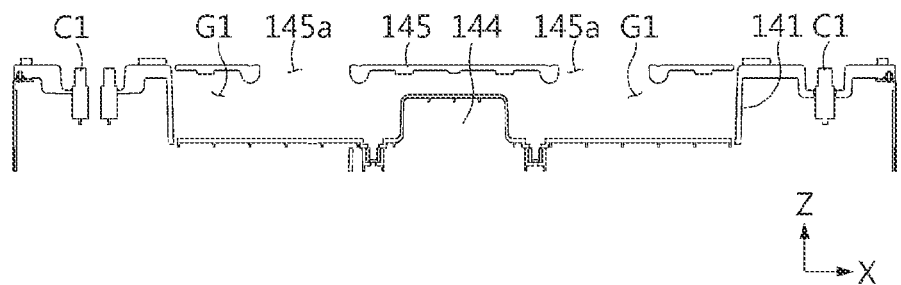
FIG. 4 is a sectional view, taken along the line 4-4 of FIG. 2.

Referring to FIGS. 3 and 4, the battery module 100 includes a cell stack 110, a module housing 120, a lower cover 130, and an upper cover assembly 140.

The cell stack 110 may include a plurality of battery cells electrically connected to each other, and may include additional components for mechanically coupling and/or electrically coupling the plurality of battery cells. As the battery cell used to configure the cell stack 110, for example, a pouch-type battery cell may be applied.

The module housing 120 has an approximately rectangular parallelepiped shape with openings formed at the top and bottom thereof, respectively, and accommodates the cell stack 110 in the inner space thereof. The module housing 120 may have a form in which a front plate 121 and a rear plate 122 are combined. However, the structure of the module housing 120 is not limited thereto, and the module housing 120 may have an integrated structure, rather than a structure in which a plurality of pieces are combined, and alternatively, may have a form in which three or more pieces are combined.

The lower cover 130 covers the bottom opening of the module housing 120 and supports the cell stack 110. The lower cover 130 has a special structure to induce gas to be discharged downward when internal gas and flame are generated due to abnormality of the battery pack 1 and also to minimize the external emission of the flame. This structure will be described later in detail with reference to FIGS. 10 and 11, along with the specific structure of the supporting plate 200.

The upper cover assembly 140 covers the top opening of the module housing 120, and secures the airtightness of the top opening of the module housing 120 so that the gas and flame generated due to abnormality of the battery pack 1 are not discharged upward.

The upper cover assembly 140 may include an upper cover 141, a fuse 142, a fuse holder 143, a fuse cover 144, and a cover plate 145.

The upper cover 141 covers the top opening of the module housing 120 and has a first connector C1 formed at one side thereof in a longitudinal direction (a direction parallel to the X axis in FIG. 3). In addition, the upper cover 141 has an upper cover groove 141a formed at the center thereof to be concave downward. The upper cover groove 141a communicates with the accommodating space in the module housing 120 for accommodating the cell stack 110 through a hole formed in the upper cover 141. This is for electrical connection between the cell stack 110 accommodated in the module housing 120 and the fuse 142 installed in the cover groove 141a.

The fuse holder 143 is fixed in the upper cover groove 141a and fixes the fuse 142. However, in the present disclosure, the fuse holder 143 may be excluded, and in this case, the fuse 142 may be directly fixed to an inner surface of the upper cover groove 141a by using an adhesive member or be fixed using a fixing structure integrally formed with the upper cover 141 inside the upper cover groove 141a.

The fuse cover 144 has a length and width corresponding to the upper cover groove 141a, and covers the fuse 142 and the fuse holder 143 inside the upper cover groove 141a.

The cover plate 145 covers the top of the upper cover groove 141a, and is coupled to the upper cover 141. The cover plate 145 has at least one pair of cover plate holes 145a, and is installed to be spaced apart from the fuse cover 144 so that a first grip groove G1 is formed between the cover plate 145 and the fuse cover 144. The cover plate hole 145a and the first grip groove G1 provide a space for a worker to grip the battery module 100 by inserting a finger or a gripping device when transporting the battery module 100, thereby giving convenience in transporting the battery module 100. In addition, the cover plate hole 145a and the first grip groove G1 provide an insertion space for the guide protrusion 311 (see FIG. 8) provided on the BMS assembly 300 as described above in addition to the above function, thereby guiding the coupling between the BMS assembly 300 and the battery module 100.

Figure 6:
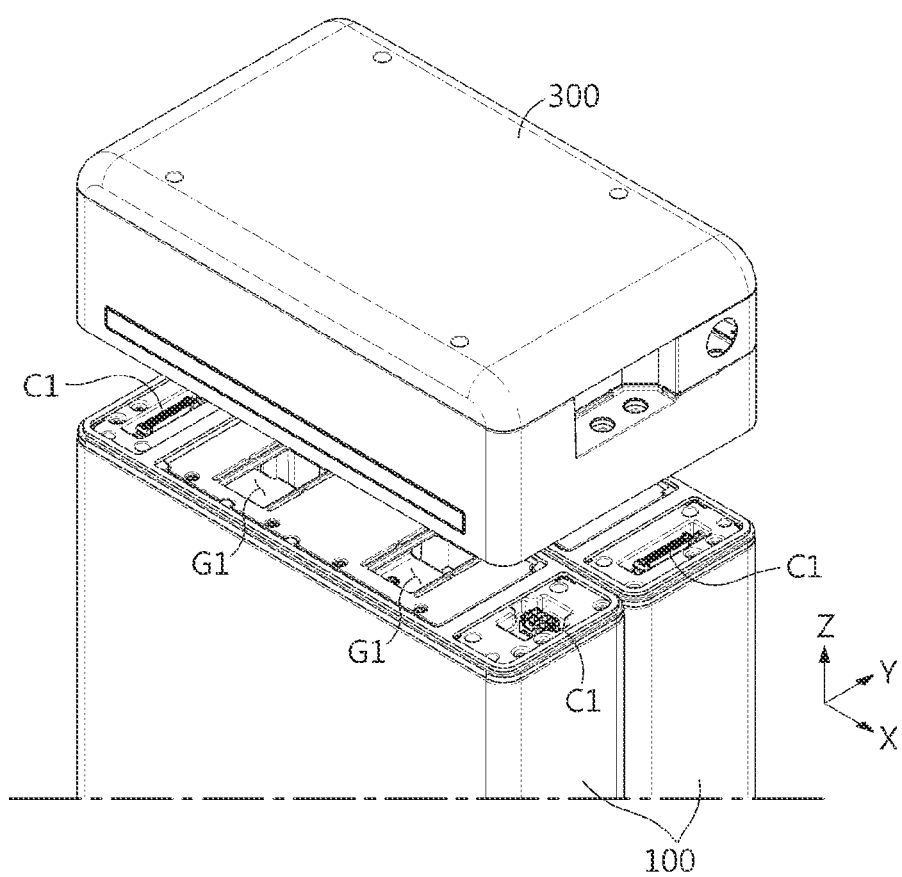
FIG. 6 is a diagram showing a coupling relationship between a pair of battery modules and a BMS assembly applied to the present disclosure.
Figure 7:
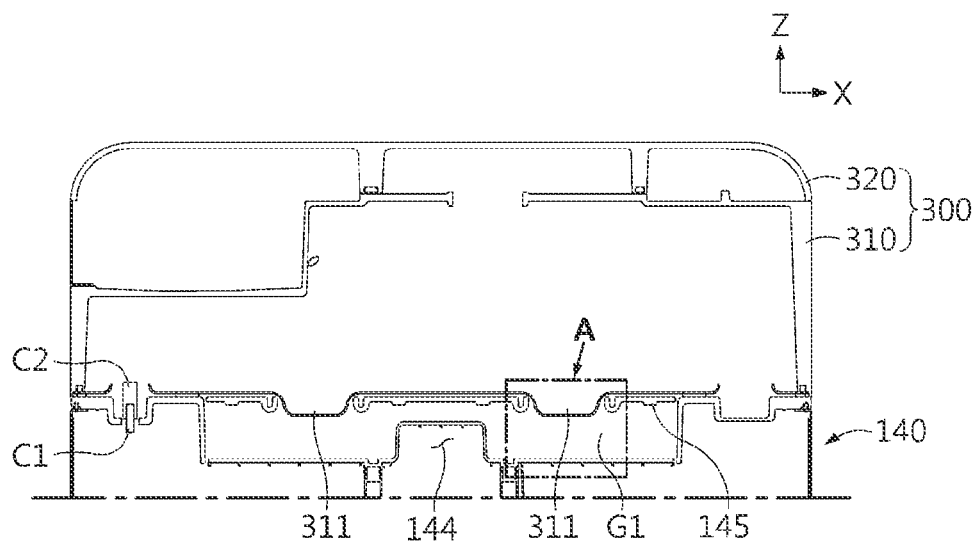
FIG. 7 is a sectional view, taken along the line 7-7 of FIG. 1.
Figure 8:
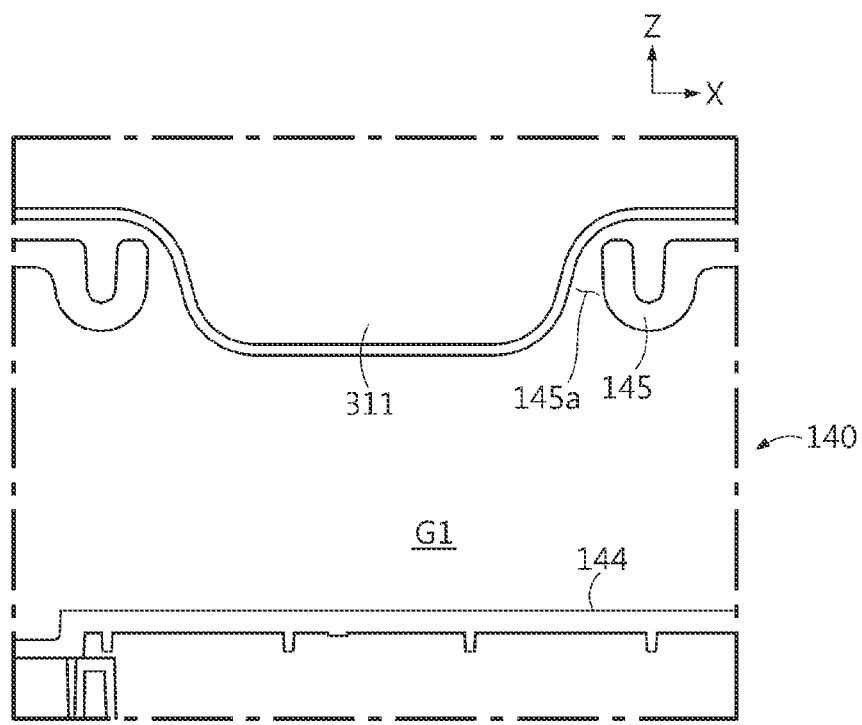
FIGS. 8 and 9 are enlarged views showing a region A of FIG. 7.

That is, as shown in FIGS. 6 to 8, in the coupling between the battery module 100 and the BMS assembly 300, if the guide protrusion 311 (see FIG. 8) and the cover plate hole 145a are aligned and coupled, the first connector C1 of the battery module 100 naturally and the second connector C2 of the BMS assembly 300 are naturally coupled.

Figure 10:
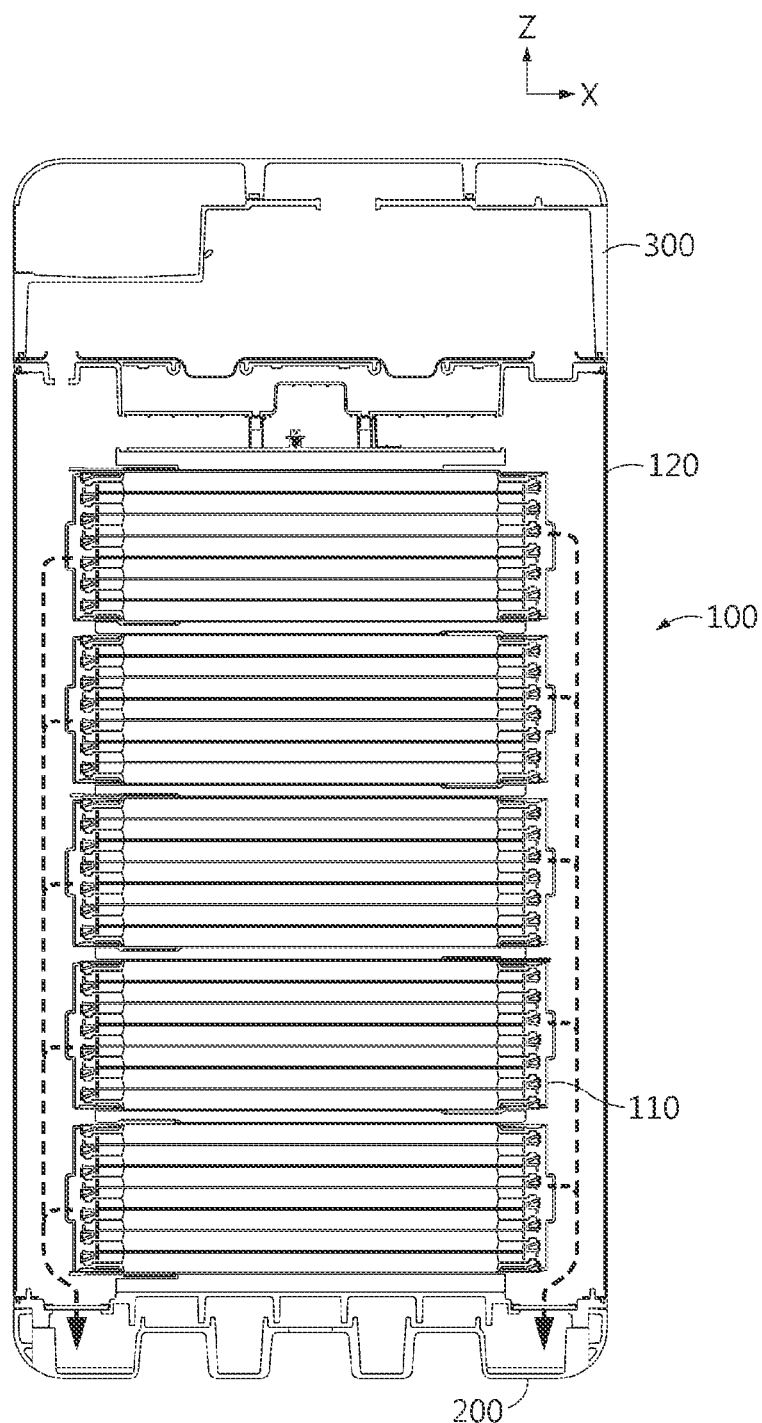
FIG. 10 is a diagram showing a movement path of flame and gas generated inside the battery module.

Meanwhile, referring to FIGS. 8 and 10, the guide protrusion 311 has a size and shape corresponding to the cover plate hole 145a, thereby preventing the gas and/or flame generated from the cell stack 110 located at a lower portion of the upper cover assembly 140 from being leaked toward the BMS assembly 300 through the upper portion of the battery module 100.

Figure 9:
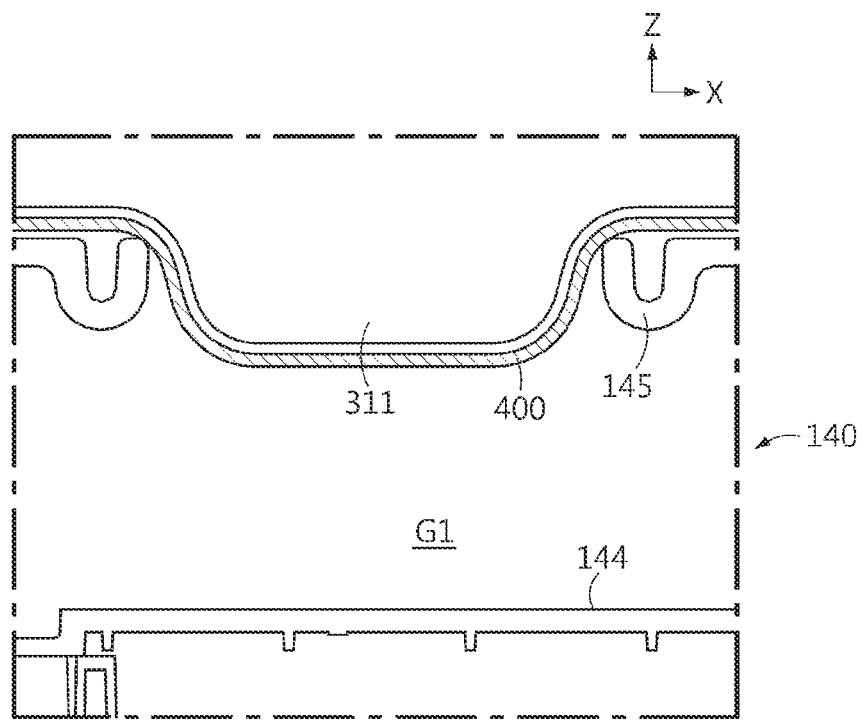

Also, referring to FIGS. 9 and 10, a gasket 400 may be interposed between the guide protrusion 311 and the inner surface of the cover plate hole 145a. This is to further increase airtightness in order to more reliably prevent the gas and/or flame generated from the cell stack 110 from being leaked toward the BMS assembly 300 through the upper portion of the battery module 100.

Figure 5:
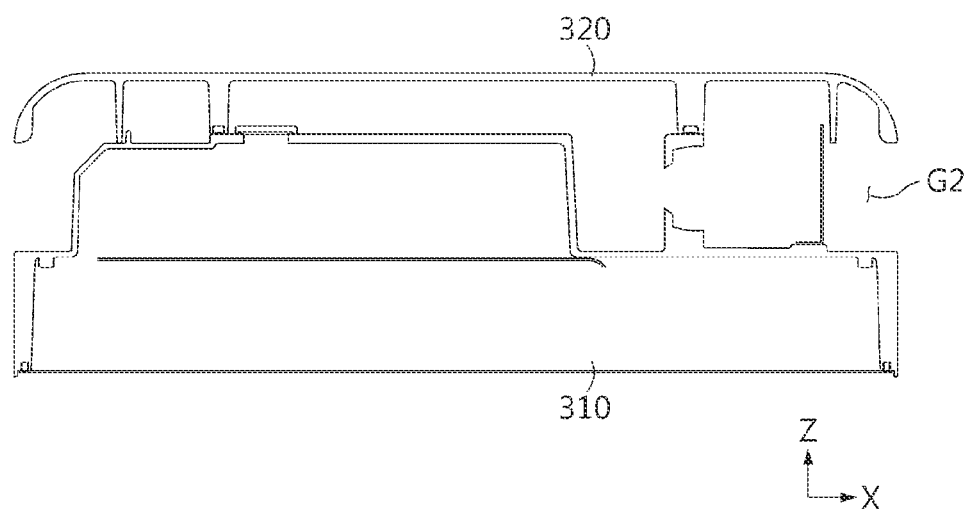
FIG. 5 is a sectional view, taken along the line 5-5 of FIG. 2.

Referring to FIGS. 5 to 7, the BMS assembly 300 includes a BMS body 310 and a BMS cover 320.

The BMS body 310 includes at least one BMS, and has at least two second connectors C2 provided at a lower surface thereof and electrically connected to the BMS. Each second connector C2 is coupled with the first connector C1 provided on the top of the plurality of battery modules 100 in one-to-one relationship, and thus each battery module 100 is electrically connected to the BMS. In addition, depending on the circuit configuration of the BMS, the battery modules 100 may be electrically connected to each other in series and/or in parallel.

The BMS cover 320 is coupled to the upper portion of the BMS body 310. The BMS cover 320 may function as a handle of the BMS assembly 300. That is, one side and the other side of the BMS cover 320 in the longitudinal direction (a direction parallel to the X axis in FIG. 5) and the upper surface of the BMS body 310 are spaced apart from each other by a predetermined distance, and accordingly, second grip grooves G2 are formed at both longitudinal sides of the BMS cover 320, respectively. The second grip groove G2 gives a space for a worker to insert a finger or a gripping device to move the BMS assembly 300 and/or transport the battery pack 1.

Next, a specific structure of the bottom of the battery module 100 and a specific structure of the supporting plate 200 will be described with reference to FIGS. 10 and 11.

A structure capable of smoothly discharging the gas generated from the cell stack 110 to the outside and preventing the flame from being discharged to the outside is formed at the bottom of the battery module 100.

The lower cover 130 includes a pair of lower cover holes 130a formed at both sides thereof in the longitudinal direction (a direction parallel to the X axis in FIG. 11) and a plurality of first partition walls 131. In addition, the lower cover 130 may further include a pair of mesh filters M. The lower cover hole 130a communicates with a gas channel P formed between the cell stack 110 and the module housing 120. Accordingly, the gas and/or flame generated from the cell stack 110 may be discharged downward (in a direction parallel to the Z axis of FIG. 11) through the lower cover hole 130a. The mesh filter M is inserted/fixed in the lower cover hole 130a. The mesh filter M allows the gas generated in the battery module 100 to pass as it is, but reduces the amount of flame discharged downward through the lower cover hole 130a and the speed of flame ejection. The first partition wall 131 has a shape extending downward from the lower surface of the lower cover 130 and is spaced apart from the upper surface of the supporting plate 200 so that gas may move along the arrow. The first partition wall 131 increases a movement path of the flame together with a second partition wall 210, explained later, so that the flame may be extinguished inside the battery pack 1 without being leaked to the outside.

The supporting plate 200 is positioned under the plurality of battery modules 100 and provides a space into which the plurality of battery modules 100 may be inserted. The supporting plate 200 includes a plurality of second partition walls 210 formed to extend upward (in a direction parallel to the Z axis in FIG. 11) and a gas discharge hole 200a formed at a center thereof in a longitudinal direction (a direction parallel to the X axis in FIG. 11). The plurality of second partition walls 210 are spaced apart from a lower surface of the battery module 100, namely a lower surface of the lower cover 130, so that gas may move along the arrow.

Among the plurality of first partition walls 131 and the plurality of second partition walls 210, the first partition wall 131 and the second partition wall 210 formed at positions corresponding to each other are overlap each other. That is, the supporting plate 200 is coupled to a bottom of the pair of battery module 100 so that the plurality of first partition walls 131 and the plurality of second partition walls 210 are adjacent and overlap each other in one-to-one pairs. Therefore, the flame introduced into the space between the lower cover 130 and the supporting plate 200 through the mesh filter M increases its movement path when it moves toward the gas discharge hole 200a, and accordingly, the flame may be extinguished without being discharged to the outside through the gas discharge hole 200a. That is, the supporting plate 200 serves as a component for fixing the battery module 100 and a component for giving a structure for extinguishing the flame simultaneously.

Figure 11:
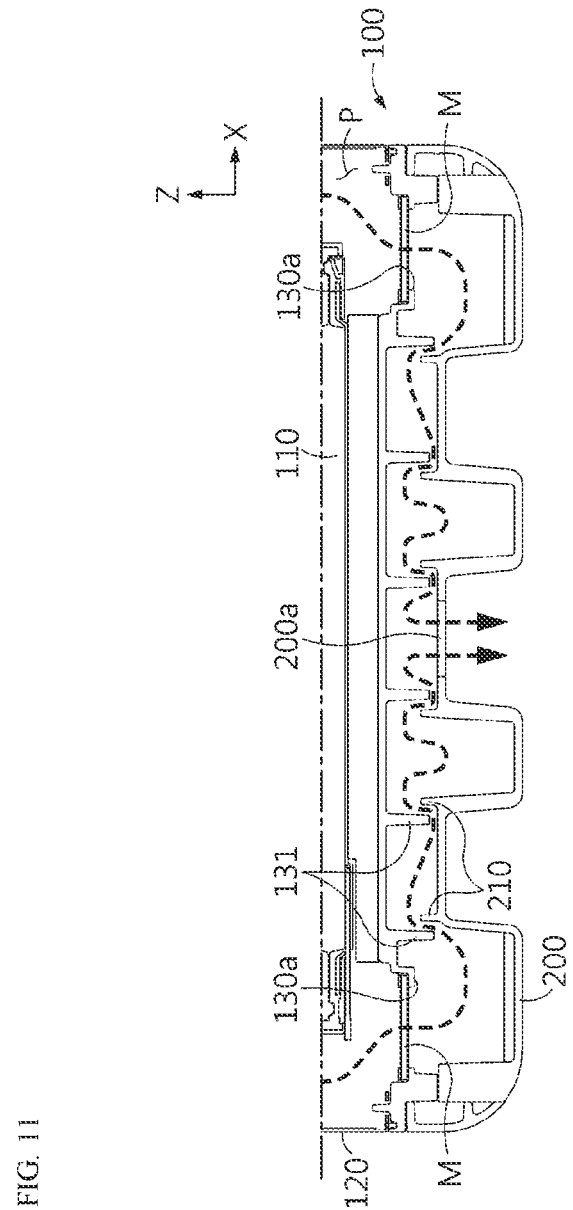
FIGS. 11 to 13 are sectional views, taken along the line 7-7 of FIG. 1, which shows a detailed structure of a coupling region between the battery module and a supporting plate.
Figure 12:
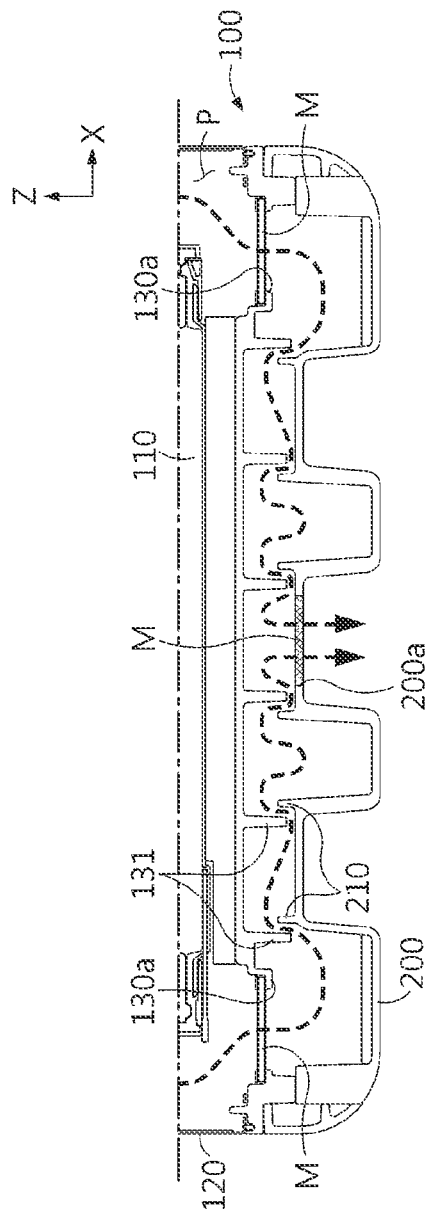

Referring to FIG. 12, unlike that shown in FIG. 11, a mesh filter M may be inserted into the gas discharge hole 200a. That is, the mesh filter M may be installed in at least one of the lower cover hole 130a of the lower cover 130 and the gas discharge hole 200a of the supporting plate 200. If the mesh filter (M) is mounted in both places, it is possible to further reduce the risk of the flame leaking out of the battery pack 1.

Figure 13:
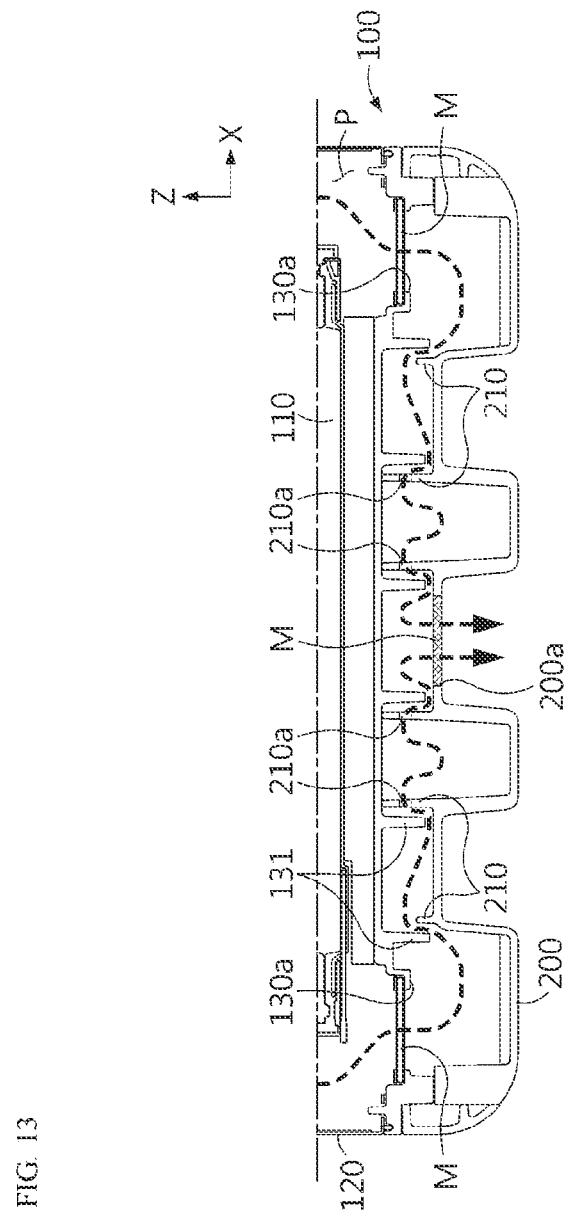

Referring to FIG. 13, unlike that shown in FIG. 11, at least a part of the plurality of second partition walls 210 may be in contact with the lower surface of the battery module 100, namely the lower surface of the lower cover 130. In this case, a partition wall hole 210a is formed in the second partition wall 210 in contact with the lower surface of the lower cover 130 to allow gas to move along the arrow. If at least a part of the plurality of second partition walls 210 is in contact with the lower surface of the lower cover 130 as above, the contact area between the lower cover 130 and the supporting plate 200 is increased, thereby improving structural rigidity.

Meanwhile, an ESS according to an embodiment of the present disclosure includes at least one battery pack 1 according to the present disclosure as described above.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A battery pack, comprising:
    a pair of battery modules, each battery module of the pair of battery modules having a lower surface and a plurality of first partition walls extending downward from the lower surface;
    a supporting plate having a plurality of second partition walls extending upward from an upper surface and a gas discharge hole formed at a longitudinal center, the supporting plate being coupled to a bottom of the pair of battery modules such that the plurality of the first partition walls and the plurality of second partition walls are adjacent and overlap each other in one-to-one pairs; and
    a Battery Management System (BMS) assembly coupled to an upper portion of the pair of battery modules,
    wherein the plurality of first partition walls are spaced apart from the supporting plate, and the plurality of second partition walls are spaced apart from the lower surface of the pair of battery modules.

2. The battery pack according to claim 1,
    wherein at least a part of the plurality of second partition walls has a partition wall hole formed in a region contacting the lower surface of the pair of battery modules and faces the first partition wall.

3. The battery pack according to claim 1, wherein each battery module of the pair of battery modules includes:
    a cell stack having a plurality of battery cells;
    a module housing configured to accommodate the cell stack;
    a lower cover configured to cover a bottom opening of the module housing; and
    an upper cover assembly configured to cover a top opening of the module housing.

4. The battery pack according to claim 3, wherein a gas channel is formed between the cell stack and the module housing.

5. The battery pack according to claim 4, wherein the lower cover has lower cover holes formed at longitudinal sides thereof to communicate with the gas channel.

6. The battery pack according to claim 5, wherein a mesh filter is inserted into at least one of the gas discharge hole and the lower cover holes.

7. The battery pack according to claim 3, wherein the upper cover assembly includes:
    an upper cover configured to cover the top opening of the module housing, the upper cover having a connector formed at one longitudinal side thereof and an upper cover groove formed at a center thereof to be concave downward;
    a fuse fixed in the upper cover groove and electrically connected to the plurality of battery cells;
    a fuse cover configured to cover the fuse inside the upper cover groove; and
    a cover plate configured to cover a top of the upper cover groove and coupled to the upper cover.

8. The battery pack according to claim 7, wherein the cover plate has at least one pair of cover plate holes and is spaced apart from the fuse cover so that a first grip groove is formed between the cover plate and the fuse cover.

9. The battery pack according to claim 8, wherein the BMS assembly includes:
    a BMS body coupled to the pair of battery modules; and
    a BMS cover coupled to an upper portion of the BMS body.

10. The battery pack according to claim 9, wherein the battery pack has second grip grooves formed between a longitudinal side of the BMS cover and a longitudinal side of the BMS body.

11. The battery pack according to claim 9, wherein the BMS body includes a guide protrusion formed at a lower surface thereof and inserted into the first grip groove through the cover plate to guide coupling between the BMS assembly and the pair of battery modules.

12. The battery pack according to claim 11, further comprising:
    a gasket interposed between the guide protrusion and an inner surface of the at least one pair of cover plate holes.

13. The battery pack according to claim 1, wherein the supporting plate is fixed to the ground.

14. An Energy Storage System, comprising at least one battery pack according to claim 1.

* * * * *